$3,373,813$
Patented Mar. 19, 1968

3,373,813
METHOD FOR PERMEABLY CONSOLIDATING AN INCOMPETENT FORMATION WITH HEAT-CURABLE RESIN
James W. Jennings, Verona, and John F. Muirhead, Jr., Oakmont, Pa., assignors to Gulf Research & Development Company, Pittsburgh, Pa., a corporation of Delaware
No Drawing. Filed July 9, 1965, Ser. No. 470,923
4 Claims. (Cl. 166—25)

ABSTRACT OF THE DISCLOSURE

Combustibles are burned in an incompetent formation surrounding a well bore to heat the formation, and the combustion step is followed by the injection of a liquid resin-forming material which in turn is followed by the injection of gas to displace a portion of a resin-forming material farther outwardly into the formation. Heat remaining in the formation following the combustion step raises the temperature of the resin-forming liquid to cause resinification. Furfuryl alcohol and partial polymers of furfuryl alcohol are preferred resin-forming materials.

This invention relates to a method for consolidating loose sand formations, particularly incompetent sand formations surrounding a well bore.

Oil bearing sand formations frequently break down and produce sand in the well bore as a result of insufficient cohesion between adjacent sand particles under the conditions prevailing in the well. These formations may break down during the drilling or well completion operations, or they may produce sand when the well is brought into production as a combined effect of the stresses created by the overburden and the flow velocity of the reservoir fluid. This represents a particular problem in sand formations in which there is inadequate natural cementing material to bind the sand grains together. Since the production of sand by the well fluid is very undesirable, many solutions to this problem have been proposed.

One method that has been used in incompetent formations is the placement of a slotted liner in the formation with gravel packing to hold back the sand particles. Another method involves the introduction of a substance into the incompetent formation adjacent to the well bore to supplement any naturally occurring cement and bind the sand particles together into a rigid but permeable formation. Somewhat severe requirements are placed upon this artificially introduced sand cementing material in order that the formation be adequately consolidated against the conditions which can reasonably be anticipated in well preparation or during oil production. This cementing material must both form a strong bond with the individual sand grains as well as have an adequate internal strength. In order to be effective it must be capable of penetrating the formation a critical distance from the well bore and must not substantially decrease the formation permeability. Also for general utility it is desirable that this material be temperature and moisture resistant and withstand ordinary methods of well stimulation including resistance to hot gases, hot water, steam and treating acids.

Those methods which have been used in dealing with incompetent formations have presented a number of disadvantages. When a slotted liner with gravel packing is used, it has been discovered that the sand particles or fines can migrate and plug up the conducting channels in the gravel pack. Sodium silicate or water glass has been tried as a cementing substance, but it has been found that formations consolidated with this material disintegrate in the presence of hot water. Slurries or suspensions of various cementing materials rather than true solutions have been suggested, but these cannot be used with any but the rarely encountered, coarse grain, high permeability formations because the suspended particles will filter off as a cake onto the surface of the formation without any effective penetration into the formation.

Various resin formulations have been used with variable success, however, many problems have arisen in their use. For example, premixing the resin-former with a catalyst places a positive time factor in the operation. Delays or accidents have resulted in the resin polymerizing in the equipment or well bore itself prior to introduction into the formation, or polymerization has occurred in the formation before permeability is regained. In an effort to assure adequate retention of permeability in the treated formation, a flushing liquid may be injected for partial displacement of the resin-forming solution or a liquid diluent may be used in the formulation itself which is rejected as the resin shrinks onto the sand grains and sets. However, both the adhesive characteristics and the strength of the final resin are adversely affected by these diluents and flushing agents. It is well recognized that the more successful use of these techniques requires great precision with a substantial loss of formation permeability still a common result.

In accordance with our invention an incompetent formation is consolidated with a resin by a procedure which insures that the fully cured resin realizes its full potential of adhesive and cohesive bonding strength. A further advantage and benefit of our process is that an improved permeability results than would otherwise be obtained. In our process the formation to be consolidated is first burned by in situ combustion or an equivalent burning technique at a temperature which will drive out and remove all formation liquids present in the formation under treatment. This insures that the fire-cleaned sand grains present an uncontaminated, non-interfering surface to the susequently injected resin-forming material to permit the development of an adhesive bond or full strength. In addition, this burning procedure shrinks the formation clays such that their subsequent swelling is prevented.

A further aspect of our invention involves the use of a stable heat-curable resin-forming material which is injected into the heated formation and is cured by this formation heat. Thus, by using a resin-forming material which is introduced into the formation before it is subjected to polymerizing treatment, not only is the need for a separate catalyst or catalytic treatment eliminated, but also the criticality of time prior to injection is avoided. As a result, unscheduled delays and variations in handling time can be accommodated without resinification in the well bore or other undesired location. This permits much greater flexibility in conducting the well operations and relieves the workers of pressures, which might otherwise lead to mistakes and accident.

The resin-forming composition is injected into the formation in conjunction with an inert gas such as nitrogen, or it may be injected as a slug followed immediately by the injection of the inert gas to insure permeability retention prior to setting of the resin. This gas will displace excess resin-forming material deeper into the formation leaving only a coating on the sand grains, particularly at the intergranular contacts, and by this technique avoiding the piston-like displacement and formation cooling which would occur with a liquid flush such as a liquid hydrocarbon.

In accordance with this process careful control of the consolidation operation is possible. The passage of time accompanied by the threat of premature setting of the resin prior to its placement in the formation is no longer a critical factor. The resin precursor being stable may be stored for an indefinite period of time without hardening, yet when consolidation is desired, it is immediately usable. No special purpose additives are needed in the resin-forming material; and therefore, no reduction in cohesive properties of the resin and no interference with the wetting of or adhesion to the sand grains results. A strong intergranular bonding is thereby accomplished. The resulting formation is a strong durable product possessing up to 85 percent of its original unconsolidated permeability.

In accordance with our invention a heat-curable resin-former such as furfuryl alcohol, or a fluid partial polymer formed by the homopolymerization of furfuryl alcohol or by the copolymerization of furfuryl alcohol with another substance is injected into the formation to be consolidated, and this is subsequently fully cured by the heat in the formation to a strongly adherent polymer. Furfuryl alcohol is a very fluid substance having a viscosity of 4.6 centipoises at 25° C. It is volatile at ambient conditions with a boiling point of 170° C. and is infinitely soluble in water. Its physical properties can be adjusted by partial polymerization under controlled conditions to produce a prepolymer having a viscosity of any desired value, for example, up to one thousand centipoises or more together with a lowered vapor pressure and water solubility.

In addition, those liquid partial copolymerization products of furfuryl alcohol with other substances which are heat curable are usable herein. Examples of this group are partial polymers of furfuryl alcohol with formaldehyde, with urea and formaldehyde, with phenol and formaldehyde and with one or more compounds containing two or more epoxy groups. Such mixed partial polymers are well-known in the art, a specific example being the stable, liquid partial polymer made from about 100 parts by weight of furfuryl alcohol, about 54 parts formaldehyde, and about three parts urea. In another example a mixture of 100 parts by weight of Epon 828, an epoxy resin-former made by Shell Chemical Company, ten parts of furfuryl alcohol, and three parts of boron trifluoride monoethylamine forms a stable mixture having a viscosity of 660 centipoises at 27° C. which will cure to a hard resin above 85° C. Other suitable epoxy resin-formers include Union Carbide Company's ERL 2774 and E.P. 201 (3,4 - epoxy - 6 - methyl - cyclohexylmethyl - 3,4-epoxy-6-methylcyclohexanecarboxylate). In general, these partial copolymers will be made from at least about ten percent furfuryl alcohol and will generally vary in viscosity from 100 to 10,000 centipoises. Formulations of this type of information regarding them are available from The Quaker Oats Company, an example being Furset 4090, a furfuryl alcohol-urea-formaldehyde reaction product having a viscosity of approximately 750 centipoises.

A furfuryl alcohol prepolymer useful herein can be prepared by the controlled self-condensation of furfuryl alcohol. For example, an amount of furfuryl alcohol can be heated at reflux with ten percent by weight of a 4.25 percent phosphoric acid solution. Reflux is continued for several hours until the desired viscosity is reached. When using this more viscous prepolymer or a partially co-polymerized material, it is preferred that up to about one percent of a surfactant such as isooctylamine be incorporated into the material in order to insure complete wetting of the formation particles. The viscosity of a partial polymer can be decreased for use herein by dilution with furfuryl alcohol which co-cures with the partial polymer and increases the rate of polymerization or by dilution with an organic solvent such as benzene or toluene which evaporates as the curing resin deposits onto the sand grains but has no significant effect on the curing rate. A retarding of the rate of cure may be accomplished, if desired to insure its proper placement in the formation, by addition of up to about 65 percent of an unsaturated fatty acid such as linseed oil, which is preferred because of low cost, with an organic solvent such as benzene to provide miscibility and decrease the viscosity.

In consolidating sand formations hereunder, the formation is first burned at a temperature of at least about 800° F. throughout the zone to be treated to insure complete removal of undesired organic matter and to shrink the clays. After completion of burning, an inert cooling gas is injected, if desired, to reduce the formation temperature for injection of the resin-former; otherwise, the resin-forming liquid is injected into the formation with or immediately followed by an inert gas to insure liquid displacement and permeability retention. A suitable continuous procedure involves the injection of the inert cooling gas following the burning for such time as required, then entraining the resin-former in the inert gas and continuing the inert gas injection until permeability is established. The inert gas injection is then stopped to prevent over cooling of the formation and the resin is permitted to fully cure before the well is put into production or subjected to some other scheduled operation. Alternatively, injection of the inert gas may be continued during cure to insure permeability retention provided that it is heated so that the cure is not adversely affected, or up to about 20 percent of an acid gas, such as hydrogen chloride, may be incorporated in the inert gas to accelerate curing once it has begun. The inert gas may be nitrogen, carbon dioxide, one of the rare gases, ammonia, combustion gases, natural gas, and the like. By inert is meant that the gas is non-reactive with the resin-forming or resinified material and will not support combustion under the conditions encountered.

Any suitable method for heating the formation to the desired temperature may be used. Downhole propane burners operated on air are readily available and satisfactory. The air heated by the burner is injected into the formation and the unused oxygen will burn the reservoir oil in in situ combustion. Or a suitable downhole electric heater may be used in combination with air injection. Also, air alone may be injected for in situ combustion with ignition preferably augmented by an accepted method such as by use of a pyrophoric material. If the oil in the formation is not suited for in situ combustion, or if there is insufficient oil or no oil in place, a suitable quantity of a combustible fuel may be injected into the formation to support in situ combustion. However, the same result may be accomplished by using a downhole burner or heater which is operated at a sufficiently high temperature to heat the formation and burn off the reservoir fluids without in situ combustion occurring.

The preferred temperature range for curing furfuryl alcohol and furfuryl alcohol prepolymers is between about 350° to 550° F. with about 375° to 425° F. being the optimum range. I have found that the resin might still be tacky after 24-hours at about 300° F. while the cure at about 600° F. is sufficiently rapid that excessive heating may cause a gradual degradation of the cured resin. At 400° F. the curing time is approximately four hours. The incipient curing temperature of the copolymeric materials must be substantially above ambient conditions so that they will possess the desired preinjection stability with the actual curing characteristics being a function of the specific formulation.

In consolidating with these resin-forming materials average compressive strengths greater than 500 p.s.i. are readily obtainable with compressive strengths over 2000 p.s.i. and acceptable permeabilities resulting at optimum conditions. A final permeability of at least about 60 to 85 percent of the original permeability is desired with the permeability retention in part being dependent upon the initial viscosity of the treating solution and the rate of cure of the resin at the formation temperature. Up to about 65 percent of a curing retarder such as linseed oil may be used in the resin formulation to insure that permeability is regained before substantial resinification occurs upon injection of the formulation. It is also contemplated that an impermeable underground consolidation formation may be produced very simply by burning off the formation fluids and injecting a heat-curable resin-former into the formation without using a permeability regaining flushing fluid in conjunction with or following the resin-former.

The time it takes for complete resinification to occur is primarily controlled by the temperature at which curing is effected and this is primarily dependent on the formulation used. Since the curing rate increases with increasing formation temperature and pressure, these should be correlated along with the formulation in order to accomplish the desired result. It is preferred when using furfuryl alcohol base materials that the formation temperature be no greater than 600° F. and preferably less than 500° F. so that over curing will not occur. If the formation temperature is higher than desired, a cooling flush may be used such as a cool inert gas to cool the formation to the desired temperature prior to injection of the resin-former. Furfuryl alcohol monomer is more sensitive to formation conditions than the prepolymer mixture. An elevated temperature in the formation together with a low formation pressure may result in significant evaporation and loss of the monomer necessitating under these conditions the use of a suitable prepolymer formulation or the substantial cooling of the formation. When over cooling of the formation has occurred either by design or through inadvertence such as by heat dissipation through prolonged standing, it may be necessary to follow up the treating liquid with a catalytic treatment such as injection of an acid gas catalyst when curing can be effected by this technique, or by injection of a hot inert gas to heat the resin-former to the curing range. For example, the formation can be cooled by air with the resin-former injected when the formation is cool and cured by injecting the heated gases from a downhole propane burner or equivalent. Acid gas catalysts usable in this manner with acid-curable resin-formers include hydrogen chloride, gaseous acyl halides such as methyl chloride, gaseous Lewis acids such as boron trifluoride, boron trichloride, hydrogen sulfide and the like—a specific example being about 20 percent hydrogen chloride in an inert gas. Also usable when the formation temperature permits but less preferred is the injection of a liquid solution of the acid catalyst.

The process is now illustrated in the consolidation of a ten-foot pay zone lying between the interval of 2480 feet to 2490 feet. The casing is perforated near the middle of the pay zone with a four-inch single point entry notch using a radial jet. The pressure of the formation is 500 p.s.i. Pressure is maintained at the wellhead as a downhole propane burner is lowered near to the point of entry. A threefold stoichiometric excess of air is pumped down the well and the burned ignited to give an exhaust temperature of 1000° F. The heated air enters the formation and combustion of the formation crude is initiated. After about four hours, a burned out sphere about six feet in radius and about 800° F. in temperature is produced. The burner is stopped and pulled from the well as air pressure is maintained on the well to prevent back flow of formation fluids into the burned out zone. Nitrogen is injected in the well, forcing the air into the formation ahead of it, until the formation is cooled to 400° F. Furfuryl alcohol containing 30 volume percent linseed oil is then entrained into the nitrogen stream until 200 gallons have been added. Nitrogen injection is continued until a total of 50M c.f. have been injected into the formation. The well is then shut-in for 24 hours to permit complete cure of the resin. The well is then put into production and produces sand-free oil over an extended period of time indicating successful consolidation.

Sand can be consolidated by the preburning technique described herein to give the optimum permeability and strength. The burning will shrink the clays thereby increasing the pore volume and will remove all of the formation's liquids, not possible with any type of liquid or gas flushing technique, permitting complete penetration of all pore spaces and wetting of all grains to increase the number of bonds per unit volume as well as increasing the strength of the indivdual bonds. The consolidated formation displays excellent resistance to hexane, benzene, water and reservoir fluids. Further, it retains these properties as long as formation temperatures do not appreciably exceed 600° F. and may be subjected to stimulation techniques such as steam injection and acid stimulation without deterioration. This process is generally useful for the consolidation of underground loose granular formations.

It is to be understood that the above disclosure is by way of specific example and that numerous modifications and variations are available to those of ordinary skill in the art without departing from the true spirit and scope of our invention.

We claim:

1. A method for permeably consolidating incompetent, permeable oil-bearing formations adjacent to underground boreholes which comprises the steps of heating the formation and simultaneously injecting an oxygen-containing gas to burn off the oil from a zone adjacent to the borehole, injecting a heat-curable resin-forming material into the heated zone while the heated zone is at a temperature of at least 300° F., injecting an inert gas into the formation to displace a portion of said resin-forming material further into said formation and reestablish the permeability of said heated zone, and permitting the resin-forming material to polymerize and consolidate said formation.

2. A method for permeably consolidating incompetent, permeable oil-bearing formations adjacent to underground boreholes which comprises the steps of heating the formation with the simultaneous injection of an oxygen-containing gas to heat the formation to at least 800° F. to burn off the oil from a zone adjacent to the borehole, cooling said heated zone to a temperature in the range of 350° to 550° F. thereafter injecting a heat-curable resin-forming material into the heated zone, injecting an inert gas into the formation to displace a portion of said resin-forming material further into said formation and reestablish the permeability of said heated zone, and permitting the resin-forming material to polymerize and consolidate said formation.

3. A method in accordance with claim 2 in which the resin-forming material is selected from the group consisting of furfuryl alcohol, prepolymers made from at least ten percent furfuryl alcohol and mixtures thereof.

4. A method for permeably consolidating incompetent formations adjacent the borehole of a well which comprises the steps of displacing air from the borehole outwardly into the formation and simultaneously heating the formation to a temperature of at least 800° F. adjacent to the borehole, displacing a cool inert gas down the borehole of the well and outwardly into the formation to reduce the temperature of the formation to the range of 350° to 550° F., and entraining a resin-forming liquid in the inert gas to deposit the resin-forming liquid in the formation, and after completing displacement of the resin-forming liquid injecting inert gas devoid of resin-forming liquid into the formation to maintain permeablity of the formation during resinification of said liquid.

References Cited

UNITED STATES PATENTS

| | | | |
|---|---|---|---|
| 2,378,817 | 6/1945 | Wrightsman | 166—33 |
| 2,399,055 | 4/1946 | Nordlander | 260—67 X |
| 2,787,325 | 4/1957 | Holbrook | 166—33 X |
| 2,796,934 | 6/1957 | Vogel | 166—33 |
| 3,126,959 | 3/1964 | Ortloff | 166—33 |
| 3,199,590 | 8/1965 | Young | 166—33 |
| 3,219,110 | 11/1965 | Martin et al. | 166—25 X |
| 3,223,161 | 12/1965 | Burge | 166—33 |

CHARLES E. O'CONNELL, *Primary Examiner.*

I. A. CALVERT, *Assistant Examiner.*